United States Patent
Uesaka

(10) Patent No.: US 11,981,114 B2
(45) Date of Patent: May 14, 2024

(54) METHOD OF MANUFACTURING SANDWICH PANEL AND SANDWICH PANEL

(71) Applicant: SUMITOMO BAKELITE CO., LTD., Tokyo (JP)

(72) Inventor: Masao Uesaka, Tokyo (JP)

(73) Assignee: SUMITOMO BAKELITE CO., LTD., Tokyo (JP)

( * ) Notice: Subject to any disclaimer, the term of this patent is extended or adjusted under 35 U.S.C. 154(b) by 0 days.

(21) Appl. No.: 18/025,705

(22) PCT Filed: Jul. 9, 2021

(86) PCT No.: PCT/JP2021/025960
§ 371 (c)(1),
(2) Date: Mar. 10, 2023

(87) PCT Pub. No.: WO2022/054388
PCT Pub. Date: Mar. 17, 2022

(65) Prior Publication Data
US 2023/0256724 A1 Aug. 17, 2023

(30) Foreign Application Priority Data
Sep. 14, 2020 (JP) .................. 2020-153525

(51) Int. Cl.
*B32B 3/12* (2006.01)
*B29C 37/00* (2006.01)
(Continued)

(52) U.S. Cl.
CPC ...... *B32B 37/1207* (2013.01); *B29C 37/0075* (2013.01); *B32B 3/12* (2013.01);
(Continued)

(58) Field of Classification Search
CPC .......... B29C 66/72525; B29C 66/7254; B29C 37/0075; B32B 37/146
(Continued)

(56) References Cited

U.S. PATENT DOCUMENTS 4,482,659 A * 11/1984 Sanjana .................... B32B 5/26
525/122
5,455,096 A * 10/1995 Toni ......................... B32B 7/12
428/116
(Continued)

FOREIGN PATENT DOCUMENTS

JP 2015-51629 A 3/2015
JP 2019-65111 A 4/2019
(Continued)

OTHER PUBLICATIONS

International Search Report dated Oct. 5, 2021, issued in counterpart International Application No. PCT/JP2021/025960 (2 pages).
(Continued)

*Primary Examiner* — Scott W Dodds
(74) *Attorney, Agent, or Firm* — WHDA, LLP

(57) ABSTRACT

A method of manufacturing a sandwich panel (100) includes: a step of preparing a plurality of sheet-like prepregs (211); a step of performing a first heating and pressurization process through a release film (25) on upper and lower surfaces of a laminate where the plurality of prepregs (211) are laminated such that the laminate is integrated to obtain a composite facing material (40); and a step of disposing the composite facing material (40) on each of an upper surface side and a lower surface side of a sheet-like core layer (10) having a honeycomb structure and integrating the laminate through a second heating and pressurization process, in which a pressure of the first heating
(Continued)

and pressurization process is higher than or equal to a pressure of the second heating and pressurization process.

14 Claims, 2 Drawing Sheets

(51) Int. Cl.
| | | |
|---|---|---|
| *B32B 5/02* | (2006.01) | |
| *B32B 5/26* | (2006.01) | |
| *B32B 7/12* | (2006.01) | |
| *B32B 27/12* | (2006.01) | |
| *B32B 27/30* | (2006.01) | |
| *B32B 27/32* | (2006.01) | |
| *B32B 27/34* | (2006.01) | |
| *B32B 27/36* | (2006.01) | |
| *B32B 37/12* | (2006.01) | |

(52) U.S. Cl.
CPC .............. *B32B 5/022* (2013.01); *B32B 5/024* (2013.01); *B32B 5/26* (2013.01); *B32B 7/12* (2013.01); *B32B 27/12* (2013.01); *B32B 27/302* (2013.01); *B32B 27/32* (2013.01); *B32B 27/34* (2013.01); *B32B 27/36* (2013.01); B32B 2037/1223 (2013.01); B32B 2250/05 (2013.01); B32B 2260/023 (2013.01); B32B 2260/046 (2013.01); B32B 2262/0269 (2013.01); B32B 2262/101 (2013.01); B32B 2305/024 (2013.01); B32B 2305/188 (2013.01); B32B 2307/54 (2013.01); B32B 2307/7376 (2023.05); B32B 2307/748 (2013.01); B32B 2309/02 (2013.01); B32B 2309/12 (2013.01); B32B 2323/10 (2013.01); B32B 2355/00 (2013.01); B32B 2367/00 (2013.01); B32B 2377/00 (2013.01); B32B 2605/18 (2013.01); B32B 2607/00 (2013.01)

(58) Field of Classification Search
USPC ........................................................ 156/182
See application file for complete search history.

(56) References Cited

U.S. PATENT DOCUMENTS

| | | | | |
|---|---|---|---|---|
| 5,773,121 | A * | 6/1998 | Meteer | B32B 27/20 428/313.5 |
| 6,005,184 | A * | 12/1999 | Barnes | H02S 40/42 136/246 |
| 6,153,721 | A * | 11/2000 | McCarthy | C07C 39/17 525/523 |
| 11,498,290 | B2 | 11/2022 | Noma et al. | |
| 2005/0025929 | A1* | 2/2005 | Smith | B32B 3/12 428/118 |
| 2008/0182067 | A1* | 7/2008 | Shen | B32B 37/146 521/50 |
| 2015/0151524 | A1* | 6/2015 | Matsura | B32B 37/1009 156/285 |
| 2016/0060281 | A1* | 3/2016 | Angell | C09K 21/12 558/76 |
| 2018/0186134 | A1* | 7/2018 | Imai | C08J 5/04 |
| 2019/0092915 | A1* | 3/2019 | Takikawa | C08G 18/6755 |
| 2019/0283345 | A1* | 9/2019 | Uesaka | B32B 37/182 |
| 2020/0029445 | A1* | 1/2020 | Kim | H05K 3/005 |
| 2021/0362441 | A1 | 11/2021 | Noma et al. | |

FOREIGN PATENT DOCUMENTS

| | | |
|---|---|---|
| JP | 2020-1268 A | 1/2020 |
| WO | 2018-16273 A1 | 1/2018 |
| WO | 2020/003609 A1 | 1/2020 |

OTHER PUBLICATIONS

Notice of Reasons for Refusal dated Dec. 7, 2021, issued in counterpart JP Patent Application No. 2021-566071, w/English translation (8 pages).

* cited by examiner

METHOD OF MANUFACTURING SANDWICH PANEL AND SANDWICH PANEL

TECHNICAL FIELD

The present invention relates to a method of manufacturing a sandwich panel and a sandwich panel.

BACKGROUND ART

The sandwich panel includes: a hollow honeycomb core having a cross-section that is formed of hexagonal walls; and a pair of skin materials such as prepregs that are bonded to opposite surfaces of the honeycomb core. The sandwich panel that is light-weight and has high rigidity is used as, for example, a structural member for an airplane.

As the method of manufacturing a sandwich panel, various methods are disclosed. As a general method, for example, a technique described in Patent Document 1 is disclosed. Patent Document 1 discloses, as a secondary adhesion forming process, a method including: laminating prepregs; allowing the laminate to enter a vacuum bag state; curing a binder resin in the prepregs using an autoclave; bonding the composite prepreg to opposite surfaces of a honeycomb core through a film-like adhesive; and pressurizing the laminate at a high temperature to cure the film-like adhesive.

RELATED DOCUMENT

Patent Document

Patent Document 1: Japanese Unexamined Patent Publication No. 2020-1268

SUMMARY OF THE INVENTION

Technical Problem

Recently, demand for the sandwich panel has increased. In particular, when voids remain in the surface of the sandwich panel, pinholes may be formed during packaging of the sandwich panel, and there is a problem in that the external appearance deteriorates. The technique disclosed in Patent Document 1 has room for improvement from the viewpoint of reducing the pinholes.

Solution to Problem

The present inventors conducted a thorough investigation in order to reduce pinholes at a higher level and achieved a finding that, by performing a first heating and pressurization process for laminating and integrating a plurality of prepregs to obtain a composite facing material in advance through a release film and setting a pressure of the first heating and pressurization process to be higher than or equal to that of a second heating and pressurization process for sandwiching the laminate, voids in the surface of the obtained sandwich panel can be reduced. That is, the present inventors focused on the fact that unevenness of the texture of a fiber substrate forming the prepregs causes the formation of pinholes in the sandwich panel and found that it is effective to control heating and pressurization conditions in the lamination and integration step of the prepregs, thereby completing the present invention. Although the detailed mechanism is not clear, according to the present invention, it is presumed that the surfaces of the prepregs are more uniformly heated and pressurized by using the release film and small unevenness of the fiber substrate forming the prepregs can be effectively reduced by setting the higher pressure.

According to the present invention, there is provided a method of manufacturing a sandwich panel including:

a step of preparing a plurality of sheet-like prepregs;

a step of performing a first heating and pressurization process through a release film on upper and lower surfaces of a laminate where the plurality of prepregs are laminated such that the laminate is integrated to obtain a composite facing material; and a step of disposing the composite facing material on each of an upper surface side and a lower surface side of a sheet-like core layer having a honeycomb structure and integrating the laminate through a second heating and pressurization process, in which a pressure of the first heating and pressurization process is higher than or equal to a pressure of the second heating and pressurization process.

In addition, according to the present invention, a sandwich panel including:

a core layer having a honeycomb structure; and a composite facing material that is provided on each of opposite surfaces of the core layer and is obtained by laminating and integrating cured products of a plurality of prepregs, in which when an outermost surface of the composite facing material is observed, a number density of pinholes is 0 to 50 piece/cm$^2$.

Advantageous Effects of Invention

According to the present invention, a technique capable of reducing pinholes in a sandwich panel can be provided.

DESCRIPTION OF EMBODIMENTS

Figure 1:
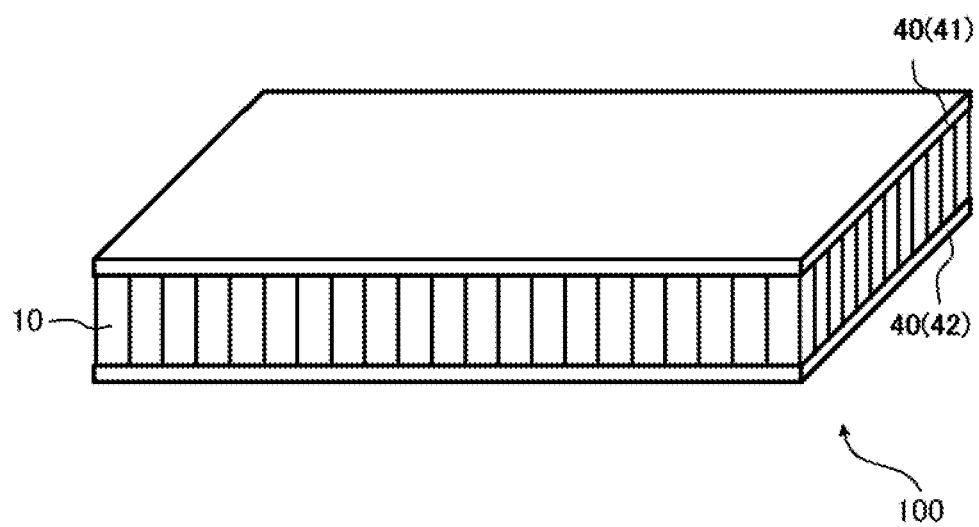
FIG. 1 is a schematic diagram showing an example of a sandwich panel according to an embodiment.

Hereinafter, an embodiment of the present invention will be described using the drawings. In all the drawings, the same components will be represented by the same reference numerals, and the description thereof will not be repeated.

In the present specification, the expression "a to b" in the description of a numerical range represents a or more and b or less unless specified otherwise. For example, "1 to 5 mass %" represents "1 mass % or higher and 5 mass % or lower".

<Sandwich Panel>

FIG. 1 is a schematic diagram showing an example of a sandwich panel according to the embodiment.

A sandwich panel 100 according to the embodiment includes: a core layer 10 having a honeycomb structure; and a cured product (composite facing material 40) of a prepreg 20 (where an upper surface is a prepreg 21 and a lower surface is a prepreg 22) that is provided on each of opposite surfaces of the core layer 10.

In addition, the sandwich panel 100 according to the embodiment includes a hot-melt adhesion layer 15 between the core layer 10 and the composite facing material 40 (not shown).

In the embodiment, when an outermost surface of the composite facing material 40 is observed, a number density of pinholes is 0 to 50 piece/cm$^2$. In other words, when at least one surface of the sandwich panel 100 is observed, a number density of pinholes is 0 to 50 piece/cm$^2$.

That is, the sandwich panel 100 according to the embodiment is obtained using the above-described manufacturing method. Therefore, the formation of voids is further suppressed as compared to the related art, and thus the number density of pinholes in the surface is suppressed.

The number density of pinholes is preferably as low as possible, more preferably 45 piece/cm$^2$ or lower, more preferably 40 piece/cm$^2$ or lower, still more preferably 30 piece/cm$^2$ or lower, and still more preferably 20 piece/cm$^2$ or lower. In addition, it is suitable that the number density of pinholes in the opposite surfaces of the sandwich panel 100 is in the above-described range.

The number density of pinholes can be obtained by counting the number of holes that can be visually recognized when the surface of the sandwich panel 100 is observed with a magnifying glass (4- to 50-fold) and dividing the number of holes by the observed area.

[Core Layer]

As the core layer 10, for example, a sheet-like member obtained by impregnating a binder resin into a substrate for a core layer having a honeycomb structure can be used. The core layer 10 can have high strength and lightness due to the honeycomb structure.

The honeycomb structure is a well-known structure and refers to a structure where a plurality of substantially regular hexagonal through holes that penetrate an upper surface to a lower surface are formed.

Examples of the substrate having the honeycomb structure of the core layer 10 include a substrate obtained by forming aramid fiber, paper, balsawood, plastic, aluminum, titanium, glass, or an alloy thereof into a honeycomb shape using a well-known method. From the viewpoint of heat resistance, it is preferable that the substrate having the honeycomb structure of the core layer 10 includes aramid fiber.

In the core layer 10, the shape of the substrate is preferably woven fiber cloth. As a result, the workability into the honeycomb structure can be improved, and the weight of the sandwich panel 100 can be improved.

When the core layer 10 includes the woven fiber cloth, it is difficult to pressurize a portion where fibers are crossed in the manufacturing step, and voids are likely to remain. However, in the sandwich panel 100 according to the embodiment, the formation of voids can be effectively suppressed using the manufacturing method described below.

The thickness of the core layer 10 is not particularly limited and, for example, may be 1 mm or more and 50 mm or less, may be 3 mm or more and 40 mm or less, or may be 5 mm or more and 30 mm or less.

The size of each of core cells in the core layer 10 is not particularly limited. For example, the length of one side of the core cell may be 1 mm or more and 10 mm or less.

The area of the surface (upper surface, lower surface) of the core layer 10 is not particularly limited. For example, the area may include the surface area of one sandwich panel 100 or may include the surface area of a plurality of sandwich panels. As a result, one sandwich panel 100 can be diced into a plurality of panels, which can improve the productivity. For example, the area of the surface (upper surface, lower surface) of the core layer 10 can be made large and, for example, may be 1 m$^2$ or more.

In addition, from the viewpoint of improving corrosion resistance or heat resistance, various surface treatments may be performed on the inside and/or the outside of the core layer 10.

[Prepreg]

As the prepreg 20, for example, a sheet member in a B-stage state obtained by impregnating a binder resin into a substrate for a prepreg can be used.

Figure 2A:
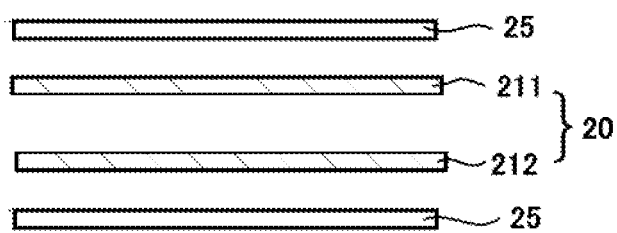
FIG. 2(*a*) and FIG. 2(*b*) are cross-sectional views showing an example of steps of a method of manufacturing a sandwich panel according to the embodiment.
Figure 2B:
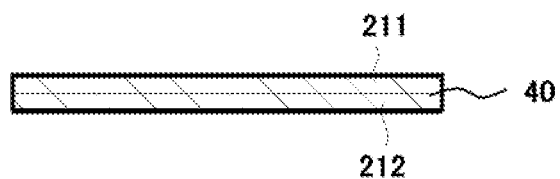

In the embodiment, the prepreg 20 is obtained by laminating a prepreg 211 and a prepreg 212 (refer to FIG. 2(a) and FIG. 2(b)).

The prepreg 20 may be obtained by laminating three or more prepregs.

Regarding the binder resin impregnated into the substrate for a prepreg, the B-stage state refers to a stage where a reaction rate calculated from the measurement result of DSC (differential scanning calorimeter) is higher than 0% and 60% or lower, preferably 0.5% or higher and 55% or lower, and more preferably 1% or higher and 50% or lower.

Examples of the substrate for a prepreg of the prepreg 20 include a fiber substrate.

As the fiber substrate, aramid fiber, polyester fiber, polyphenylene sulfide fiber, carbon fiber, graphite fiber, glass fiber, or silicon carbide fiber can be used. From the viewpoint of high heat resistance, it is preferable that the fiber substrate includes glass fiber.

By including the fiber substrate, the heat resistance of the sandwich panel 100 can be further improved. In addition, a difference in linear expansion coefficient between the composite facing material 40 and the core layer 10 can be reduced. Therefore, the warping of the sandwich panel 100 can be suppressed.

An upper limit value of a glass transition temperature (Tg) of the cured product (composite facing material 40) of the prepreg 20 is, for example, 250° C. or lower, preferably 220° C. or lower, and more preferably 200° C. or lower. As a result, a heating and pressurization process can be performed under low temperature conditions. On the other hand, a lower limit value of the glass transition temperature (Tg), for example, may be 110° C. or higher or may be 120° C. or higher. As a result, thermal time characteristics can be improved.

In the embodiment, the binder resins used for the core layer 10 and the prepreg 20 may be the same as or different from each other. From the viewpoints of effectively adhesion and improving flame resistance, it is preferable that the binder resins are the same. The binder resin will be described below.

[Composite Facing Material]

The composite facing material 40 according to the embodiment can be obtained by laminating and integrating the prepreg 211 and the prepreg 212 and curing the binder resin through a first heating and pressurization process described below. In other words, the composite facing material 40 is obtained by laminating and integrating the cured products of the prepreg 211 and the prepreg 212.

[Adhesion Layer]

Figure 3A:
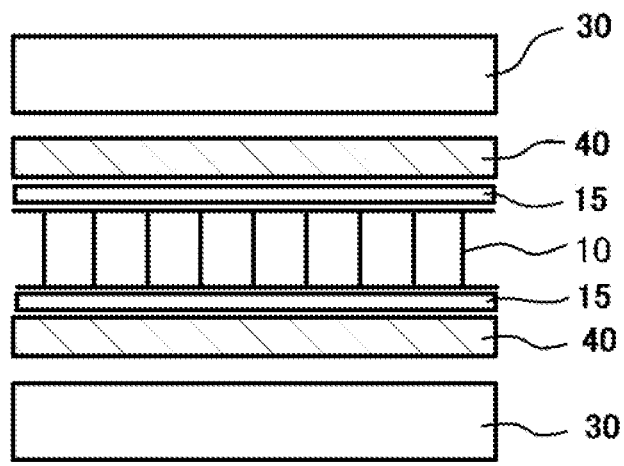
FIG. 3(*a*) to FIG. 3(*c*) are cross-sectional views showing an example of steps of the method of manufacturing a sandwich panel according to the embodiment.
Figure 3B:
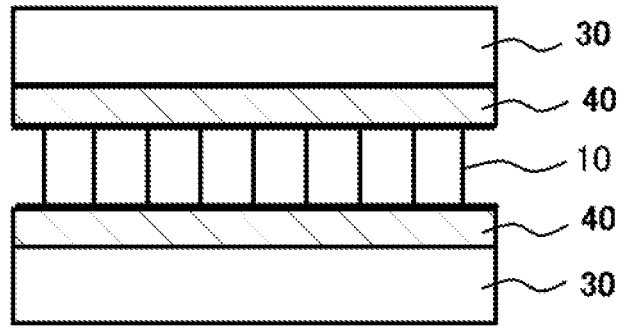
Figure 3C:
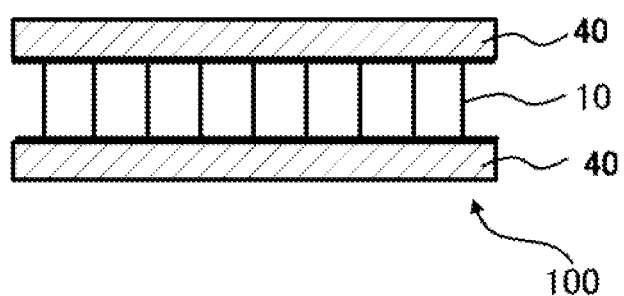

In the embodiment, the hot-melt adhesion layer 15 is interposed between the core layer 10 and each of the composite facing materials 40 (refer to FIG. 3(a) to FIG. 3(c)). As a result, the formation of voids can be suppressed while improving adhesion.

In the embodiment, as the hot-melt adhesion layer 15, a well-known adhesion layer can be used. It is preferable that the hot-melt adhesion layer 15 is formed of a hot-melt adhesive. As a result, the occurrence of internal stress or strain after curing is likely to be reduced, and the formation of voids can be effectively suppressed.

The hot-melt adhesive includes, as a main component, a non-curable resin that is flowable at a high temperature and returns to a non-flowable state by cooling. That is, the hot-melt adhesive melts and exhibits adhesiveness at a specific temperature or higher.

Examples of the non-curable resin include one kind or more or two kinds or more selected from the group consisting of a polyurethane resin, an acrylonitrile resin, a diene resin, an acrylic resin, a butadiene resin, a polyamide resin, a polyvinyl butyral resin, an olefin resin, an isoprene resin, a butadiene resin, a chloroprene resin, an acrylonitrile resin, a polyester resin, a polyvinyl chloride resin, a styrene resin, an ethylene-vinyl acetate resin, a fluorine resin, a silicone resin, a thermoplastic resin including a copolymer thereof.

It is more preferable that the hot-melt adhesive includes polyamide as a main component.

A viscosity of the hot-melt adhesive at 163° C. is preferably about 30,000 centipoise (cP) or lower, more preferably about 20,000 centipoise (cP) or lower, and still more preferably about 10,000 centipoise (cP) or lower.

The hot-melt adhesive in the embodiment refers to an adhesive including 20 to 65 wt % of a polymer component that exhibits a tensile stress of 0.5 to 3.5 MPa at an elongation of 300% in a test according to ASTM D 412-06A.

In addition, the shape of the hot-melt adhesion layer 15 is not particularly limited and, from the viewpoint of effectively suppressing the formation of voids, is preferably non-woven or film-like.

[Use]

The sandwich panel 100 according to the embodiment can be suitably used as a panel for an airplane. For example, the sandwich panel 100 can be used as an interior equipment of an airplane such as a lavatory or a partition or as a furniture in an airplane such as a wagon chassis.

<Method of Manufacturing Sandwich Panel>

Next, the method of manufacturing the sandwich panel 100 according to the embodiment will be described.

(Step 1) Preparation of Core Layer 10 and Prepregs 211 and 212

The substrate for a core layer is prepared. It is preferable that the substrate for a core layer has a honeycomb structure and is formed of aramid fiber.

The substrate having the honeycomb structure is prepared and is impregnated with a binder solution. Next, the substrate is dried, and the core layer 10 is obtained.

On the other hand, the substrate for a prepreg is prepared. Examples of the substrate for a prepreg include the fiber substrate. The binder resin is impregnated into the substrate for a prepreg. Next, the substrate is dried, and each of the prepregs 211 and 212 in a B-stage state is obtained.

Examples of the method of impregnating the binder resin include a method of dissolving the binder resin in a solvent and spraying and applying the obtained solution to the substrate using an injection device such as a spray nozzle, a method of dipping the substrate in the solution, a method of applying the solution to the substrate using various coaters such as a knife coater or a comma coater, and a method of transferring the solution to the substrate using a transfer roller. In particular, the method of dipping the substrate for a prepreg in the solution is preferable.

In addition, heating and drying conditions are not particularly limited and are typically 100° C. to 220° C. and preferably 120° C. to 190° C. and 2 to 10 minutes.

[Binder Solution]

The binder solution is a solution in which the binder resin and the like is dissolved in a well-known organic solvent, and a well-known solution can be used. As the binder resin, a thermosetting resin is preferable, and examples thereof include a thermosetting resin such as a phenol resin, an unsaturated polyester resin, or an epoxy resin. Examples of the phenol resin include a compound having one or more phenolic hydroxyl group in a molecule, for example, a novolac resin such as novolac phenol, novolac cresol, or novolac naphthol; a bisphenol resin such as bisphenol F or bisphenol A; a phenol aralkyl resin such as a paraxylene modified phenol resin; a resol phenol resin such as dimethylene ether resol or methylol phenol; and a compound obtained by methylolating the above-described resin or the like.

In particular, from the viewpoint of obtaining releasability from a pressing plate or the like in the lamination and integration step, it is preferable that the binder resin includes a phenol resin.

In addition, the binder solution may include additives other than the above-described thermosetting resin. The additives are not particularly limited, and examples thereof include a filler such as an inorganic filler, rubber, and a thermoplastic resin.

(Step 2) Integration of Prepregs

Next, as shown in FIG. 2(*a*), the sheet-like prepregs 211 and 212 are prepared. The prepregs 211 and 212 are in a B-stage state. The materials and the thicknesses of the prepregs 211 and 212 may be the same as or different from each other.

Next, as shown in FIG. 2(*b*), the first heating and pressurization process is performed the laminate where the prepregs 211 and 212 are laminated through a release film such that the binder resin is cured and the prepregs 211 and 212 are integrated to obtain the cured product of the prepreg 20, that is, the composite facing material 40. At this time, the laminated sheet-like prepregs 211 and 212 are uniformly heated and pressurized in the vertical direction by disposing a flat pressing plate on each of the upper and lower surfaces thereof through the release film.

The first heating and pressurization process is performed preferably at 110° C. to 150° C. and 0.5 to 3.0 MPa and more preferably at 120° C. to 140° C. and 1.5 to 2.5 MPa.

By setting the temperature and the pressure of the first heating and pressurization process to be the lower limit value or higher, the prepregs 211 and 212 can be strongly integrated.

On the other hand, by setting the temperature and the pressure of the first heating and pressurization process to be the upper limit value or lower, the prepregs 211 and 212 can be appropriately integrated while suppressing fracture thereof.

In the embodiment, the pressure of the first heating and pressurization process is higher than or equal to a pressure of a second heating and pressurization process described below. As a result, while reducing voids in the composite facing material 40, the adhesion between the composite facing material 40 and the core layer 10 can be favorably maintained, and the formation of voids in the sandwich panel 100 can be effectively reduced.

In addition, it is preferable that the pressure of the first heating and pressurization process is higher than that of the second heating and pressurization process described below.

As a result, the formation of voids in the sandwich panel 100 can be more effectively reduced.

In addition, in the embodiment, in the integration step of the prepregs 211 and 212, the first heating and pressurization process is performed while pressing a smooth surface of the pressing plate against each of the upper and lower surfaces of the laminated prepregs through a release film 25.

As a result, the pressure can be more uniformly applied to the entire surface of the prepregs 211 and 212, and the formation of voids in the sandwich panel 100 can be effectively suppressed.

As the pressing plate, a well-known plate can be used, and examples thereof include the same plate as a metal plate 30 described below.

(Release Film)

For example, it is preferable that the release film 25 according to the embodiment includes one kind or two or more kinds selected from polyalkylene terephthalate resins including a polyethylene terephthalate resin (PET), a polybutylene terephthalate resin (PBT), a polytrimethylene terephthalate resin (PTT), and a polyhexamethylene terephthalate resin (PHT), a poly(4-methyl-1-pentene) resin (TPX), a syndiotactic polystyrene resin (SPS), and a polypropylene resin (PP). In particular, a poly(4-methyl-1-pentene) resin (TPX) or a polypropylene resin (PP) is more preferable.

In addition, in the release film 25, a storage modulus (frequency 100 Hz, 100° C.) measured after performing a heating process at 180° C. for 120 seconds is preferably 0.05 GPa or higher and 10 GPa or lower and more preferably 0.1 GPa or higher and 5 GPa or lower.

As a result, the releasability from unevenness of the release film after the use of the release film (after heating press) can be improved. That is, by controlling the value of the storage modulus after applying thermal history to be in the above-described numerical range, a variation in the degree of crystallinity of the release film before and after the use of the release film (before and after the heating press) can be increased, and thus the releasability can be improved while maintaining the followability. In addition, appropriate elasticity for the integration of the prepregs can be obtained, the pressure can be more uniformly applied, and the formation of voids in the sandwich panel 100 can be effectively reduced.

The thickness of the release film 25 is preferably 50 μm or more and 150 μm or less, more preferably 75 μm or more and 140 μm or less, and most preferably 90 μm or more and 130 μm or less. As a result, during the preparation of a formed article, the pressure can be more uniformly applied to the release film 25, and the formation of voids can be further suppressed.

(Step 3) Collective Lamination

Next, the prepared composite facing material 40 is integrated with the core layer 10.

As shown in FIG. 3(a), the composite facing material 40 is disposed on an opening surface of each of the upper surface side and the lower surface side of the core layer 10, and the composite facing material 40 and the core layer 10 are collectively laminated through the second heating and pressurization process. In addition, the metal plate 30 (in which the upper side is a metal plate 31 and the lower side is a metal plate 32) is disposed to perform the heating and pressurization process on the composite facing material 40.

Next, as shown in FIG. 3(b), while allowing the metal plate 30 to abut against the composite facing material 40, the core layer 10 and the composite facing material 40 are collectively laminated through the second heating and pressurization process. AS a result, the core layer 10 and the composite facing material 40 can be integrated.

For the second heating and pressurization process, for example, 110° C. to 140° C., 30 minutes to 90 minutes, and 0.35 MPa to 2.0 MPa can be adopted as preferable conditions, and 120° C. to 130° C., 30 minutes to 90 minutes, and 0.5 MPa to 1.0 MPa can be adopted as more preferable conditions.

In addition, the second heating and pressurization process can be performed in the atmosphere. Therefore, the productivity can be improved.

In addition, as shown in FIG. 3(a), in the embodiment, the hot-melt adhesion layer 15 is interposed between each of the composite facing materials 40 and the core layer 10 for the lamination. As a result, voids present in the core layer 10 and the composite facing material 40 are filled with the hot-melt adhesion layer 15, and the formation of voids in the surface of the sandwich panel 100 can be suppressed.

As the metal plate 30, a well-known plate can be used, and examples thereof include a metal plate such as SUS plate, a tinned plate, an aluminum plate, or a magnesium plate.

In addition, the thickness of the metal plate 30 is not particularly limited and, for example, may be 0.5 mm or more and 10 mm or less, may be 0.8 mm or more and 5 mm or less, or may be 1.0 mm or more and 2.0 mm or less. In the above-described range, a balance between rigidity and thermal conductivity can be achieved.

Next, as shown in FIG. 3(c), by separating the metal plate 30 from the composite facing material 40, the sandwich panel 100 can be obtained.

Hereinafter, the embodiment of the present invention has been described with reference to the drawings. However, the embodiment is merely an example of the present invention, and various configurations other than the above-described configurations can also be adopted.

In the above-described embodiment, the example using the release film is described. However, the release film does not need to be used.

EXAMPLES

Hereinafter, examples of the present invention will be described in detail. However, the present invention is not limited to the description of the examples.

<Preparation of Sandwich Panel>

Example 1

(Manufacturing of Composite Facing Material)

A phenol resin (resol phenol resin "34370" manufactured by Durez Plastics & Chemicals, Inc.) was compounded and was impregnated with glass fiber (#7781, manufactured by Hexcel Corporation) to obtain a sheet-like prepreg (thickness: 250 μm). The prepreg was in a B-stage state.

The obtained two prepregs were laminated, a SUS plate (thickness: 1.5 mm, Rz: 1.0 μm) was pressed against each of opposite surfaces of the laminate, and the laminate was heated and pressurized (first heating and pressurization process) using a mechanical press at 2.0 MPa and 130° C. for 60 minutes such that the phenol resin in the prepreg was cured to form a composite facing material. At this time, a release film (polymethylpentene: TPX (registered trade name) film, thickness: 120 μm) was disposed between the SUS plate and the prepregs.

(Manufacturing of Sandwich Panel)

A hot-melt adhesive (main component: polyamide) was disposed on each of opposite surfaces of a honeycomb core (aramid fiber, thickness: 10 mm, HRH-10-1/8-3.0 (manufactured by Hexcel Corporation, area: 1 m×3 m), and the obtained composite facing material was further disposed thereon to obtain a laminate.

Next, a SUS plate (thickness: 1.5 mm, Rz: 1.0 μm) was pressed against each of opposite surfaces of the laminate, and the laminate was heated and pressurized (second heating and pressurization process) using a mechanical press at 0.7 MPa and 127° C. for 60 minutes such that the phenol resin in the prepreg was cured to form a resin plate. Next, the SUS plate was separated from the resin plate to obtain a sandwich panel including the resin plate, the honeycomb core, and the resin plate.

Example 2

A sandwich panel was obtained using the same method as that of Example 1, except that "polypropylene: TORAYFAN (registered trade name), thickness: 100 μm was used as the release film instead of "polymethylpentene: TPX (registered trade name) film".

Example 3

A sandwich panel was obtained using the same method as that of Example 1, except that the pressure of the first heating process was changed from 2.0 MPa to 0.7 MPa.

Comparative Example 11

A sandwich panel was obtained using the same method as that of Example 1, except that the release film was not disposed between the SUS plate and the prepregs.

Reference Example

A phenol resin was compounded and was impregnated with glass fiber (#7781, manufactured by Hexcel Corporation) to obtain a sheet-like prepreg (thickness: 250 μm). The prepreg was in a B-stage state.

The obtained prepreg in the B-stage state was disposed on each of opposite surfaces of the honeycomb core to obtain a laminate, the laminate was put into a vacuum bag, the laminate was collectively heated and cured in an autoclave under conditions of 0.7 MPa, 127° C., and 60 minutes to obtain a sandwich panel.

(Evaluation Item)

Regarding the above-described sandwich panel, the following evaluation was performed. The evaluation results are shown in Table 1.

Measurement of Pinholes

A surface of the obtained sandwich panel on the front side was observed with a magnifying glass (4-fold), and the number of pinholes was measured to calculate the density.

The present application claims priority based on Japanese Patent Application No. 2020-153525 filed on Sep. 14, 2020, the entire content of which is incorporated herein by reference.

REFERENCE SIGNS LIST 10 core layer
15 hot-melt adhesion layer
20 prepreg
21 prepreg
22 prepreg
25 release film
30 metal plate
31 metal plate
32 metal plate
40 composite facing material
100 sandwich panel
211 prepreg
212 prepreg

The invention claimed is:

1. A method of manufacturing a sandwich panel comprising:
    preparing prepregs, each of the prepregs having a sheet shape;
    preparing first laminates, each of the first laminates comprising at least two sheets of the prepregs stacked each other, and a release film provided on each of an upper surface and a lower surface of the prepregs stacked;
    applying a first heating and pressurization process to each of the first laminates through the release film to cure the prepregs included in each of the first laminates, followed by removing the release film, thereby obtaining composite facing materials;
    providing a core layer having a honeycomb structure;
    disposing one of the composite facing materials on an upper surface side of the core layer, and another of the composite facing materials on a lower surface side of the core layer, thereby obtaining a second laminate; and
    applying a second heating and pressurization process to the second laminate to integrate said one, the core layer and said another in this order, thereby obtaining the sandwich panel,
    wherein a pressure of the first heating and pressurization process is higher than or equal to a pressure of the second heating and pressurization process, and
    wherein the release film includes a resin selected from the group consisting of a polyethylene terephthalate resin (PET), a polybutylene terephthalate resin (PBT), a

TABLE 1

|  |  | Example 1 | Example 2 | Example 3 | Comparative Example 1 | Reference Example |
|---|---|---|---|---|---|---|
| First Heating and Pressurization Process | ° C. | 130 | 130 | 130 | 130 | — |
|  | MPa. | 2.0 | 2.0 | 0.7 | 2.0 | — |
| Release Film | Presence | Present | Present | Present | Not Present | Not Present |
| Second Heating and Pressurization Process | ° C. | 130 | 130 | 130 | 130 | 130 |
|  | MPa | 0.7 | 0.7 | 0.7 | 0.7 | 0.7 |
| Adhesion Layer | Presence | Present | Present | Present | Present | Not Present |
| Storage Modulus (Frequency 1 Hz, 100° C.) | GPa | 3 | 0.07 | 3 | — | — |
| Pinhole Density | Piece/cm$^2$ | 0 | 10 | 25 | 70 | 100 | polytrimethylene terephthalate resin (PTT), and a polyhexamethylene terephthalate resin (PHT), a poly(4-methyl-1-pentene) resin (TPX), a syndiotactic polystyrene resin (SPS), and combinations thereof.

2. The method of manufacturing a sandwich panel according to claim 1,
wherein the first heating and pressurization process is performed at 110° C. to 140° C. and 0.5 to 3.0 MPa.

3. The method of manufacturing a sandwich panel according to claim 1,
wherein the core layer includes a woven fiber cloth.

4. The method of manufacturing a sandwich panel according to claim 1,
wherein when disposing said one, the core layer and said another in this order, a hot-melt adhesive is interposed between the core layer and said one of the composite facing materials, and between the core layer and said another of the composite facing materials.

5. The method of manufacturing a sandwich panel according to claim 4,
wherein the hot-melt adhesive includes polyamide as a main component.

6. The method of manufacturing a sandwich panel according to claim 4,
wherein the hot-melt adhesive is non-woven or in a film shape.

7. The method of manufacturing a sandwich panel according to claim 1,
wherein in the release film, a storage modulus (frequency 1 Hz, 100° C.) measured after performing a heating process at 180° C. for 120 seconds is 0.05 GPa or higher and 10 GPa or lower.

8. The method of manufacturing a sandwich panel according to claim 1,
wherein each of the prepregs is a sheet member in a B-stage state obtained by impregnating a binder resin into a substrate for a prepreg.

9. The method of manufacturing a sandwich panel according to claim 1,
wherein a thickness of the release film is 50 μm or more and 150 μm or less.

10. The method of manufacturing a sandwich panel according to claim 1,
wherein a pressure of the second heating and pressurization process is 0.35 to 2.0 MPa.

11. The method of manufacturing a sandwich panel according to claim 1,
wherein each of the composite facing materials is a cured product.

12. The method of manufacturing a sandwich panel according to claim 8,
wherein the binder resin includes a resin selected from the group consisting of a phenol resin, an unsaturated polyester resin, an epoxy resin and combinations thereof.

13. The method of manufacturing a sandwich panel according to claim 1,
wherein a glass transition temperature of a cured product of the prepregs is 110° C. or higher and 250° C. or lower.

14. The method of manufacturing a sandwich panel according to claim 1,
wherein the sandwich panel is used as a panel for an airplane.

* * * * *